J. BECKER.
FOCUSING CAMERA.
APPLICATION FILED FEB. 5, 1916.

1,178,478.

Patented Apr. 4, 1916.
3 SHEETS—SHEET 2.

$EM = M'E' = \varphi = 36 cm$
$FN = N'F' = f = 24 cm$

| $\frac{\varphi}{f} = \frac{3}{2}$ | $\frac{Cv'}{Cv} = \frac{i'}{i} = \frac{\varphi^2}{f^2} = \frac{9}{4}$ |

SCALE FOR FIG. 2

Inventor
Joseph Becker

UNITED STATES PATENT OFFICE.

JOSEPH BECKER, OF WASHINGTON, DISTRICT OF COLUMBIA.

FOCUSING-CAMERA.

1,178,478. Specification of Letters Patent. Patented Apr. 4, 1916.

Application filed February 5, 1916. Serial No. 76,423.

*To all whom it may concern:*

Be it known that I, JOSEPH BECKER, a citizen of the United States, residing at Washington, District of Columbia, have invented new and useful Improvements in Focusing-Cameras, of which the following is a specification.

My present patent application is identified for convenience of reference in my related patents and applications as Case Af.

The present specification will hereinafter make specific references to my other related applications or patents as follows: Case A, Serial No. 26,647, filed August 11, 1900; Case B, Serial No. 42,957, filed January 12, 1901; Case I, Serial No. 211,452, filed June 7, 1904; Case C, Serial No. 63,106, filed June 4, 1901; Case F, Serial No. 67,469, filed July 8, 1901; Case K, now Patent 1,103,342, issued July 14, 1914; Case O, now Patent 1,103,343, issued July 14, 1914; Case T, now Patent 1,142,295, issued June 8, 1915; Case U, Serial No. 659,021, filed November 7, 1911; Case Y, Serial No. 732,488, filed November 20, 1912; Case Ab, Serial No. 820,695, filed February 24, 1914; Case Ae, Serial No. 66,371, filed December 11, 1915; British Patent 24,292, filed November 1, 1911; British Patent 29,701, filed December 24, 1912.

My present invention relates to "two-lens cameras" or combinations comprising two focusing cameras mounted on a common base, and having their movable or focusing parts connected by mechanism which is intended to act in such manner that focusing the one camera on a given normal object plane of its field, will automatically act to set the other camera in focus on the same normal object plane, so that one of the two cameras may be used exclusively as an "optical focuser" for automatically focusing the other camera, exclusively used as "exposing camera."

The present invention completes and merges the invention first disclosed in Figure 2 of my said Case I, by providing the combination of said Fig. 2, with adjustments that permit of setting and regulating the device, by means of three distinct focusing operations which secure exact 3-and-all-point correspondence between the "focuser" and the camera proper, substantially as in the theoretically accurate mechanical focusers of my said Cases K, O, T, U, Y, Ab; or substantially as in the theoretically accurate optical focusers of my said Case Ae.

Where the two lenses used are exact duplicates, having exactly the same focal length, and exactly the same internodal space, and such internodal space has the same sign and occupies exactly the same position in the lens mount, the combination constitutes what is known as a "twin-lens camera." It is extremely difficult, however, to make two lenses alike in every particular, so that if the highest available performance of the "exposing-lens" is to be attained, some adjustment must be made even in "twin-lens" cameras to provide for the accidental differences that will occur in focal length, as well as in the extent sign and location of the internodal space. Moreover, the special ends in view may impose a wide difference between the focal lengths of the two lenses, for wherever the main object is "compactness" the focusing camera is naturally made considerably smaller than the exposing camera; and wherever the main object is "easy and precise focusing" the focusing camera should, on the contrary, be made considerably larger than the exposing camera, to give it all desirable optical and mechanical advantages.

The problem of associating two cameras for coöperation in the manner here referred to, therefore, involves in its practical and most general form the use of two lenses that may differ in focal length as well as in the sign, extent and location of their internodal space; and it is to the simplest complete mechanical solution of this problem that my present invention is directed.

As a general rule the corresponding focusing displacements of a two-lens camera are of such nature that any mechanism used to connect simultaneously movable parts of the camera, belongs to the class which Robert Willis, in his *Principles of Mechanism*, London, 1870, calls "varying velocity ratio mechanism."

I have made the discovery that under very special conditions, never before realized in practice, except accidentally in the still more special case of the twin-lens camera, this "varying velocity ratio mechanism" assumes the simpler form of what Willis in the same work calls a "constant velocity ratio mechanism", and my invention is accordingly based on the discovery of the four following principles A, B, C and D:

*Principle A.*—If the lenses of any "two-lens camera" are mounted in a fixed relative position, with their axes parallel to each other and perpendicular to the line that connects their exterior principal foci, then the focusing displacements of the image receiving planes, to keep such planes simultaneously in focus on a normally approaching object or field plane, will be strictly proportional. That is to say, if such displacements for the short focus lens be $a$, $b$, $c$, or $x$ centimeters, and the corresponding displacements for the long focus lens be A, B, C, or X centimeters, then A equals $ma$, B equals $mb$, C equals $mc$, and generally $$X = mx \quad (1)$$

where $m$ is a constant multiplier.

*Principle B.*—If the focal length of the long focus lens be phi ($\varphi$) centimeters, and the focal length of the short focus lens be $f$ centimeters, then this constant multiplier $m$ of equation 1 is not equal to the focal ratio, $\frac{\varphi}{f}$, as might be supposed, but is equal to the focal ratio squared. That is to say the constant multiplier $$m = \frac{\varphi \cdot \varphi}{f \cdot f} = \frac{\varphi^2}{f^2} \quad (2)$$

*Principle C.*—This constant multiplier $m$ of equation 1, in view of equation 2, remains the same for all possible values of the two internodal spaces, as long as no change is made in the value of the focal ratio, $\frac{\varphi}{f}$.

*Principle D.*—Any form of what Robert Willis in his *Principles of Mechanism*, London, 1870, calls "constant velocity ratio mechanism," whose velocity ratio is equal to $m$ of equation 2 can be used to connect the two image receiving planes.

In the accompanying drawings.

Figure 1:
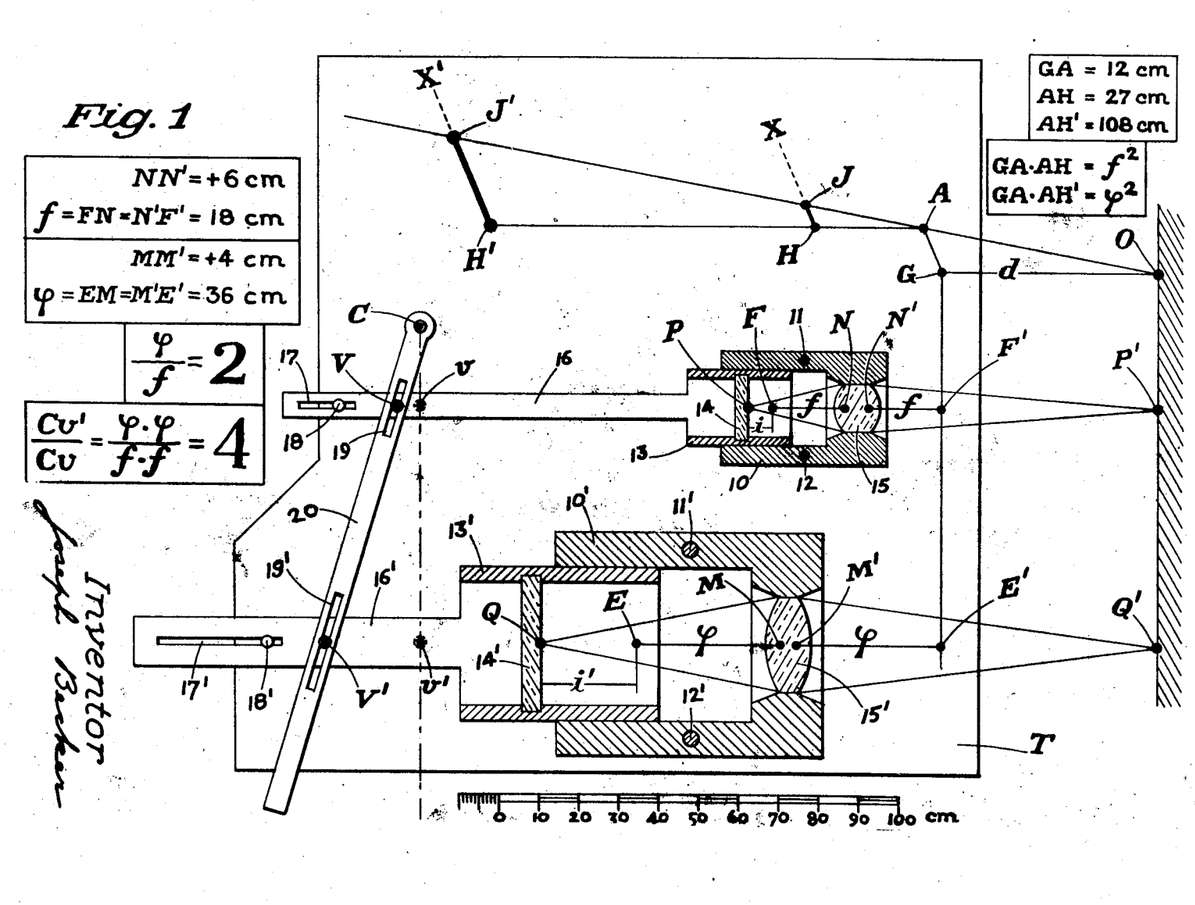
Figure 1, with tables of equations annexed as part thereof, is a sectional plan of a two-lens camera, without adjustments, but specially adapted to exhibit the principles of my present invention as directly dependent upon the fundamental principle disclosed in Fig. 1 of my said Case A.

*Camera of Fig. 1.*

Fig. 1 shows the invention in its clearest simple form without adjustments, as applied to a pair of lenses whose focal ratio, $\frac{\varphi}{f}$, is 2; and the cameras are connected by a constant velocity ratio lever whose velocity ratio, $\frac{Cv'}{Cv}$, equals 2 squared, or 4.

The smaller camera comprises a box-like lens supporting frame 10 which is fastened upon a horizontal table T by bolts 11 and 12. In this box 10 is adapted to slide the drawer 13 which supports a sensitized plate or ground glass focusing screen 14. The lens 15 has its principal foci at F and F', and its nodal points at N and N'. The focal length FN, equal N'F', is $f$, or, in the case illustrated, 18 centimeters. The internodal space NN' is 6 centimeters, being selected relatively large for clearness. The larger camera has its box-like lens supporting frame 10' fastened upon the same table T by bolts 11' and 12'. In this box 10' is adapted to slide the drawer 13' which supports a ground glass focusing screen or sensitized plate 14'. The lens 15' has its principal foci at E and E' and its nodal points at M and M'. Its focal length EM, equal M'E', is phi ($\varphi$) or in the case illustrated 36 centimeters, with an internodal space MM' of 4 centimeters.

The two cameras are fastened upon the table T in any fixed relative position, such as that shown, in which the lens axes FF' and EE' are parallel to each other and perpendicular to the line E'F' joining the two external principal foci E' and F'.

The indefinitely extended plane E'F' which is drawn perpendicularly to the two lens axes and to the table T contains the two outside focal planes of the two cameras and may be referred to as the outside focal plane E'F', although the actual focal plane of the smaller camera is, of course, limited to parts at and near F', while the actual focal plane of the larger camera is limited to parts at and near E'.

The drawer 13 of the smaller camera has a rearwardly extended tail piece 16 which is slotted at 17 to engage a guiding pin 18 that is driven into table T. The drawer 13' of the larger camera has a similar rearwardly extended tail piece 16' which is slotted at 17' to engage a guiding pin 18' that is likewise driven into table T. Tail piece 16 carries a pintle V and tail piece 16' carries a pintle V'. These pintles V and V' have sliding engagement with the radial slots 19, 19' formed in a lever 20, which is pivoted to the table T at C.

The lever 20 is one of the simplest imaginable forms of what Robert Willis in his *Principles of Mechanism,* London, 1870, terms a "constant velocity ratio mechanism;" that is to say, it simultaneously moves the pintles V' and V, respectively, through distances V'v' and Vv that satisfy the equation $$\frac{V'v'}{Vv} = \frac{Cv'}{Cv} = m \quad (3)$$

where the constant velocity ratio $m$ is the constant multiplier of equations 1 and 2.

The correctness of all principles so far laid down is easily established as follows: In the smaller camera, the image distance PF and the conjugate object distance F'P' form a constant product, in accordance with "Newton's formula," to wit:

$$PF \cdot F'P' = f^2 \quad (4)$$

which is identical with equation 4 of my said Case K. Let the image distance PF be $i$ centimeters, and the conjugate object distance F'P' or GO be $d$ centimeters; then equation 4, or Newton's formula, assumes the form $$i \cdot d = f^2 \quad (5)$$

which is identical with equation 1 of my said Case A. In the larger camera, the corresponding image distance is QE or $i'$ centimeters, and the object distance E'Q' is the same as before or $d$ centimeters, so that Newton's formula here assumes the form $$i' \cdot d = \varphi^2 \quad (6).$$

Equations 6 and 5 having factor $d$ in common, by division, yield $$\frac{i'}{i} = \frac{\varphi^2}{f^2} \quad (7)$$

Fig. 1 shows the two cameras in focus on the object plane P'Q'. When the same two cameras are in focus on infinity the lever CVV' assumes the position indicated by the axial line Cvv' so that we have $$Vv = PF = i \quad (8)$$

$$V'v' = QE = i' \quad (9)$$

These equations 8 and 9 compared with equations 3 and 7 yield $$\frac{V'v'}{Vv} = \frac{QE}{PF} = \frac{i'}{i} = \frac{\varphi^2}{f^2} = \frac{Cv'}{Cv} = m \quad (10)$$

This compound equation 10, in which the first three ratios are virtually identical, confirms equations 1 and 2, as well as the four principles A, B, C and D laid down above.

The fundamental dimensions of Fig. 1 are collected in the annexed Table A:

*Table A of dimensions in Fig. 1.*

| | | |
|---|---|---|
| $\varphi$ = EM | MM' = | +4 cm |
| | = M'E' = | 36 cm |
| | $\varphi^2$ = | 1296 cm$^2$ |
| $f$ = FN | NN' = | +6 cm |
| | = N'F' = | 18 cm |
| | $f^2$ = | 324 cm$^2$ |
| | Cv' = | 80 cm |
| | Cv = | 20 cm |
| $i$ = PF = | Vv = | 6 cm = JH |
| $i'$ = QE = | V'v' = | 24 cm = J'H' |
| $d$ = F'P' = | E'Q' = | 54 cm = GO |

The spaces JH, J'H', and GO of this table will be explained later on.

The smaller camera of Fig. 1 is evidently in focus for $$i = 6$$
$$d = 54$$

and $$i \cdot d = 324 = f^2$$

which is in accordance with equation 5.

The larger camera of Fig. 1 is evidently in focus, for $$i' = 24$$
$$d = 54$$

and $$i' \cdot d = 1296 = \varphi^2$$

which is in accordance with equation 6. Moreover, we have for the focal ratio, in Fig. 1

$$\frac{\varphi}{f} = \frac{36}{18} = 2$$

and for the focal ratio squared $$\frac{\varphi}{f} \cdot \frac{\varphi}{f} = 2 \times 2 = 4$$

and in perfect agreement herewith $$\frac{Cv'}{Cv} = \frac{80}{20} = 4$$

also $$\frac{i'}{i} = \frac{24}{6} = 4$$

so that equation 10 is fully satisfied.

*Case A, as fundamental.*

The principle of the "focal ratio squared" involved in equation 2 may be derived in another way with the aid of the diagram OGAHJ, which is identical with the similarly lettered diagram seen in Fig. 1 of my said Case A. Let O be a point in the object plane at distance $d$ centimeters from its projection G on the external focal plane E'F'. On table T, to one side of the direction OG, select any preferred point A, and through A draw the line A H parallel to OG and of such length that $$GA.AH = f^2 \quad (11)$$

and then, through H, draw the line H X, parallel to GA. Now draw and produce OA to meet HX in J, then, in view of the disclosures made in my said Case A, the segment JH will equal PF or $i$; that is to say, $$JH = PF = i = Vv \quad (12)$$

Applying the same principles to the larger camera, we have, in view of equation 11, $$GA.AH' = \varphi^2 \quad (13)$$

and the segment J'H', cut off by ray OA, determines the image distance QE or $i'$, so that we have $$J'H' = QE = i' = V'v' \quad (14)$$

Equation 12 is derivable from the similar triangles OGA and AHJ as follows:

$$\frac{JH}{AH} = \frac{GA}{GO}$$

whence, in view of equations 11 and 5, $$JH = \frac{GA.AH}{GO} = \frac{f^2}{d} = i = PF = Vv.$$

Equation 14 is derivable from the similar triangles OGA and AH'J' by a similar procedure, to wit:

$$\frac{J'H'}{AH'} = \frac{GA}{GO}$$

whence, in view of equations 13 and 6, $$J'H' = \frac{GA.AH'}{GO} = \frac{\varphi^2}{d} = i' = QE = V'v'.$$

The pivoted ray AJJ' of my said Case A, therefore, acts, on points J and J', in exactly the same way, as the pivoted lever CVV' acts on the pintles V and V'.

*Adjustable form, Figs. 2 to 5.*

Figures 2, 3:
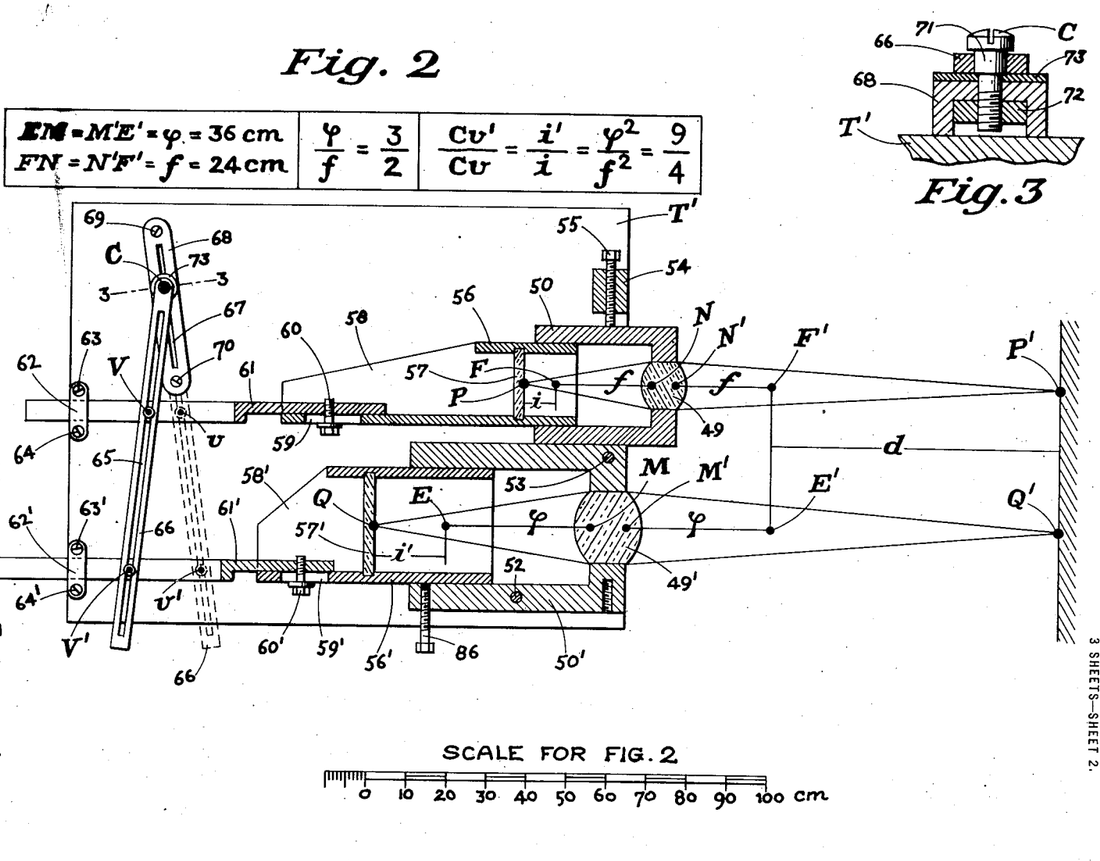
Fig. 2, likewise provided with a table of equations as part thereof, is a sectional plan of a two-lens camera that is provided with the adjustments that are necessary to permit of securing exact 3-and-hence-all-point correspondence between the two lenses by means of 3 entirely independent focusing operations.
Fig. 3 is an enlarged detail vertical section, on plane 3—3 of Fig. 2, showing the construction of the adjustable fulcrum bolt C.

Figs. 2 to 5 show a two lens camera provided with adjustments that permit of setting and regulating it by means of three distinct focusing operations to secure, exactly, any desired 3-and-hence-all-point correspondence between the camera proper and its optical focuser, substantially in the same manner as in the theoretically exact mechanical focusers of my said Cases K, O, T, U, Y and Ab, and of my said British Patents 24292 of 1911 and 29701 of 1912; also substantially as in the theoretically exact optical focusers of my said Case Ae. Fig. 2 shows the cameras completely adjusted and regulated and set in focus on the object plane P'Q'. The lenses 49' and 49 have focal lengths phi ($\varphi$) and $f$ whose ratio is $$\frac{\varphi}{f} = \frac{36}{24} = \frac{3}{2}$$

and the cameras, in view of equation 2, are connected by a constant velocity ratio mechanism whose constant velocity ratio, or constant multiplier, $\frac{Cv'}{Cv}$, is the focal ratio squared or $\frac{9}{4}$.

The lens supporting box 50' of the larger camera is firmly fastened upon table T' by means of bolts 52, 53.

The box 50' and the table T' form an angle in which the lens supporting box 50 of the smaller camera is adapted to fit and slide longitudinally for adjustment.

A post 54 that projects from the table T' carries a clamp screw 55 which serves to hold and permanently clamp the smaller lens support 50 in its properly adjusted position on the larger lens support 50'.

The purpose of providing the lens supports 50 and 50' with a longitudinal adjustment, as shown, is to permit of accurately setting the external principal focus F' of the lens 49 directly over the external principal focus E' of the larger lens 49', so that the line E'F' shall be perpendicular to the two parallel lens axes, this being the condition that must be satisfied, under "Principle A", above in order to permit of using a constant velocity ratio mechanism for connecting the two image planes P and Q.

The drawer 56 of the smaller camera carries the ground glass or sensitized surface 57 and is provided with a tail piece 58 which is slotted at 59 to admit a clamp screw 60. This clamp screw 60 screws into a bar 61 to clamp said bar to the tail piece 58 in any desired longitudinal adjustment so that the said bar 61 and the said tail piece 58 shall thereafter move together as a single piece, which is guided at its right-hand end by the box 50 and at its left hand end by a keeper or bearing 62 which is fastened to table T' by screws 63, 64. The drawer 56' of the larger camera carries the sensitized or ground glass surfaces 57' and is provided with a tail piece 58' which is slotted at 59' to admit a clamp screw 60'. This clamp screw 60' screws into a bar 61' to clamp said bar to the said tail piece 58' in any desired longitudinal adjustment so that the said bar 61' and the said tail piece 58' shall thereafter move together as a single piece, which is guided at its right hand end by the box 50' and at its left hand end by a keeper or bearing 62', which is fastened to table T' by screws 63', 64'. Bar 61 carries a pintle V, and bar 61' carries a pintle V'. These pintles V and V' have sliding engagement with the radial slot 65 formed in a lever 66 which has its fulcrum C adjustable in the groove 67 of a recessed bar 68 that is firmly fastened to the table T' by screws 69, 70.

The cross section Fig. 3, taken on plane 3—3 of Fig. 2 shows the details of fulcrum C on a scale that is four times as large as that used in Fig. 2. This fulcrum pin or bolt C has three different diametrical dimensions; its largest diameter is at the head; its intermediate diameter is directly under the head, at 71, where it fits in the lever 66; and, its smallest diameter is where it passes through a washer 73 and into the groove 67 of bar 68. The under face of this bar 68 is recessed to form a rectangular channel or slide way for a nut 72 and the washer 73 is provided to coöperate with the said nut in firmly clamping the fulcrum C to bar 68 in any desired position on such bar. No clamping effect is exerted on the lever 66 because the thickness of this lever is made a trifle less than the height of the cylindrical part 71.

Figure 5:
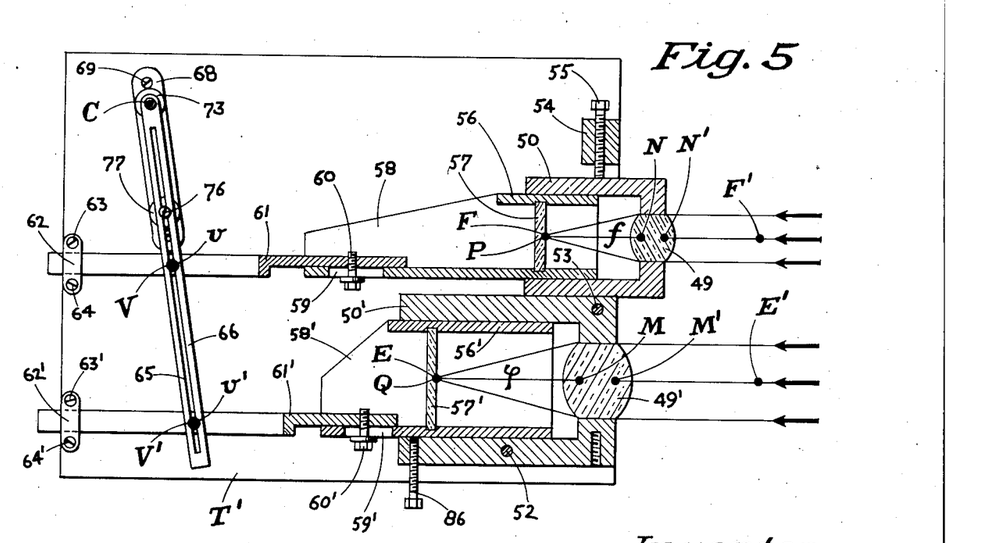
Fig. 5 is a view, also similar to that of Fig. 2, but illustrating the adjustment that is made by focusing on right infinity.

The bar 68 might be fastened to table T' so as to be exactly perpendicular to the lens axes F F' and E E', but it is preferably set a little inclined in the direction shown in order that the two extreme positions of lever 66 shall be oppositely and about equally inclined; for, as appears in Fig. 5, the lever 66 is parallel to bar 68 when the two cameras are at minimum extension or in focus on infinity.

The camera is adjusted and regulated for use by means of three independent focusing operations, as follows: First, by focusing on left infinity as illustrated in Fig. 4; secondly, by focusing on right infinity as illustrated in Fig. 5; thirdly by focusing on an object plane P'Q', Fig. 2 situated at a finite distance.

Figure 4:
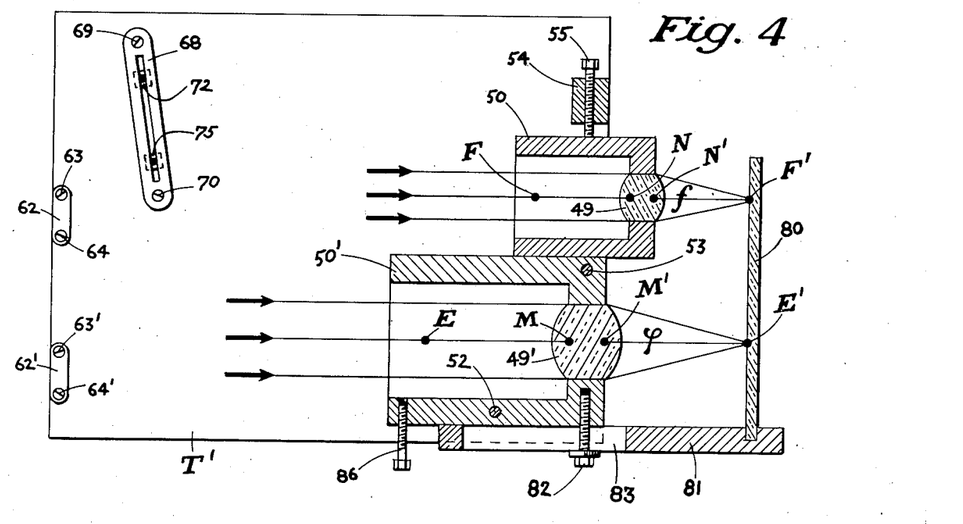
Fig. 4 is a view similar to that of Fig. 2 but illustrating the adjustment that is made by focusing on left infinity.

*Adjustment No. 1.*—Adjustment No. 1, illustrated in Fig. 4, is made, after temporarily removing the drawers 56 and 56', by focusing on left infinity with the assistance of an auxiliary ground glass screen 80 which is sufficiently extended to cover the two, at this close range, separate camera fields. This screen 80 is mounted on a foot 81 that is clamped to the larger camera box 50' by a cap screw 82, which passes through a slot 83 formed in foot 81. Screw 82 is first loosened to permit of setting screen 80 in focus on parallel rays coming from left infinity through the larger lens 49'. When the position of sharpest focus has been found the screw 82 is retightened to hold the parts 49', 50', 80 and 81 in relatively fixed adjustment so that the ground or left hand face of screen 80 shall be firmly held to pass normally through the external principal focus E' of lens 49', as indicated in Fig. 4. Set screw 55 is now loosened to permit of bringing the external principal focus F' of the smaller camera into the same ground or left hand face of screen 80. That is to say the lens 49 is set in focus on left infinity and it is firmly and permanently clamped in such position by retightening screw 55. Screw 82 is now withdrawn, to unmount the ground glass 80 and its foot 81, and prepare the camera for adjustment number two.

*Adjustment No. 2.*—Adjustment No. 2, illustrated in Fig. 5, is made by focusing on right hand infinity. The drawers 56 and 56' with their tail pieces, 61 and 61', are reinserted as indicated in Fig. 5, and the lever 66 is set and held exactly parallel to bar 68. This exact parallelism is secured by clamping the fulcrum pivot C high up in groove 67 and then inserting a second clamp bolt 76 through slot 65 of lever 66 and through a washer 77 into groove 67 of bar 68, and into a duplicate of nut 72, seen at 75 in Fig. 4. The lever 66 now holds the pintles V and V' in their zero positions, the positions identified as $v$ and $v'$ in Fig. 2. Clamp screw 60 is now loosened to set plane P in focus on right infinity. This brings point P into coincidence with the inside principal focus F, as shown in Fig. 5, and then screw 60 is again firmly tightened to lock the parts 58 and 61 in their thus self-determined proper and permanent relative position. Clamp screw 60' is similarly loosened to set plane Q in focus on right infinity or parallel rays from the right. This brings point Q into coincidence with the inside principal focus E, as shown in Fig. 5, and then screw 60' is again firmly tightened to lock the parts 58' and 61' in their thus self-determined proper and permanent relative position. This completes adjustment number two, and clamp screw 76 is now removed to free lever 66 for the third adjustment.

*Adjustment No. 3.*—Adjustment No. 3 can be explained with the aid of Fig. 2. It is made by first setting the larger camera in focus on a relatively close normal object plane P'Q', and then temporarily clamping its drawer 58' in its sharply focused position by tightening a clamp screw 86, and this temporarily holds the pintle V' stationary. As V' is to one side of its zero position $v'$, loosening pivot C and sliding it along in groove 67 will impart focusing displacements to the plane P, and when P has thus been brought into the position where it shows the sharpest image of P', bolt C is firmly reclamped to bar 68, in its thus self-determined proper and permanent position. This completes the third and last focusing adjustment so that the screw 86 may be loosened and the device will be ready for use on any normal object plane however close or distant such plane may be. That is to say, if no structural limits were placed on the extensibility of the cameras, the distance $d$ Fig. 2 might have any values included between the limits $d$ equal zero and $d$ equal infinity. Instead of shifting bolt C along in its groove 67, to focus the smaller camera, in the third adjustment, it may be more convenient to proceed as follows: Remove the bolt C entirely so that the upper end of the lever 66 may be moved transversely of bar 68 about V′ as a fulcrum, as an ordinary lever; and, when the in-focus position of P on P′ has been found and temporarily held, by clamping, so as to temporarily fix pintle V, the lever 66 is slid along, on the now both stationary pintles V and V′, until its upper bearing registers exactly with groove 67; and then the bolt C may be reinserted and firmly clamped to bar 68, in its proper position as before.

The values of the co-varying Newtonian spaces as they occur in Figs. 4, 5 and 2 are collected for comparison in the following table:

| Newtonian species. | In Fig. 4. | In Fig. 5. | In Fig. 2. |
|---|---|---|---|
| $i$ | 8 | 0 | 8 cm |
| $i'$ | 8 | 0 | 18 cm |
| $d$ | 0 | ∞ | 72 cm |

To facilitate verification by scale and by computing the fundamental dimensions of Fig. 2 are collected in the annexed Table B.

*Table B of dimensions in Fig. 2.*

| | |
|---|---|
| MM′ = | +9 cm |
| $\varphi$ = EM = M′E′ = | 36 cm |
| $\varphi^2$ = | 1296 cm² |
| NN′ = | +6 cm |
| $f$ = FN = N′F′ = | 24 cm |
| $f^2$ = | 576 cm² |
| Cv′ = | 72 cm |
| Cv = | 32 cm |
| $i$ = PF = Vv = | 8 cm |
| $i'$ = QE = V′v′ = | 18 cm |
| $d$ = F′P′ = E′Q′ = | 72 cm |

The smaller camera of Fig. 2 is evidently in focus, for $$i = 8$$
$$d = 72$$

and $$i.d = 576 = f^2$$

which is in accordance with equation 5.

The larger camera of Fig. 2 is evidently in focus for $$i' = 18$$
$$d = 72$$

and $$i'.d = 1296 = \varphi^2$$

which is in accordance with equation 6.

Moreover we have for the focal ratio, in Fig. 2

$$\frac{\varphi}{f} = \frac{36}{24} = \frac{3}{2}$$

and for the focal ratio squared $$\frac{\varphi}{f}\cdot\frac{\varphi}{f} = \frac{3}{2} \times \frac{3}{2} = \frac{9}{4}$$

and in perfect agreement herewith $$\frac{Cv'}{Cv} = \frac{72}{32} = \frac{9}{4}$$

also $$\frac{i'}{i} = \frac{18}{8} = \frac{9}{4}$$

so that equation 10 is as fully satisfied in Fig. 2 as it was in Fig. 1.

NOTE 1.—After completion of all adjustments, and while the device is in use, the camera is virtually composed of three relatively movable rigid elements, to wit: (1) the lenses and their common support; (2) the plane P and its support; (3) the plane Q and its support. The camera may be built so that any one of these three rigid elements shall be stationary, provided the other two are made movable, and in all cases where the lenses are movable they must move together as parts of one rigid mechanical element.

NOTE 2.—Exact 3-point correspondence for any arbitrarily desired three different finite values of the object distance $d$, may be secured in the camera of Fig. 2, by following the "general 3-point method of adjustment" shown in Fig. 7 of my said Case Y, and in Fig. 16 of my said British Patent 29701/12.

NOTE 3.—The camera that is used as focuser should in all cases be adjusted to secure the sharpest optical focus; but, for reasons that are fully explained in my said Case A, the camera that is used as "exposing camera" should preferably be adjusted to secure the shapest actinic or chemical focus.

NOTE 4.—The "focus-squared principle of my equation 2 is fundamental in that it recurs in all my focusers wherever a focuser either mechanical or optical comprises a transmission whose velocity ratio is constant, or substantially so. The principle is therefore involved: *First*, in the approximately accurate optical focusers seen in Figs. 33 and 57ᵇ of my said Case A; *secondly* in the approximately accurate optical focusers of my said Case B which, in Fig. 10, for focal lengths related as 3, 4, and 5, shows velocity ratios related as 9, 16 and 25; *thirdly*, in the theoretically accurate optical focuser seen in Fig. 2 of my said Case I, corresponding to the present Fig. 1; *fourthly*, in the theoretically accurate mechanical focuser of my said Case Ab which contains the broadest claim for adjustments based on such principle; *fifthly*, in the theoretically accurate optical focusers of my present application, Case Af.

NOTE 5.—I am aware that Turner and Jamieson, in British Patent No. 5,354, filed March 5, 1906, show a two-lens camera substantially such as might be formed in my Fig. 1, by fixing the two image planes P and Q to table T and causing the two lenses to move, by means of pinions, at rates exactly proportional to their focal ratio $\frac{\varphi}{f}$; but this combination differs from mine in five several respects as follows: *First*, the two lenses of Turner and Jamieson are relatively movable, for they move at different rates, whereas my lenses 15 and 15' are relatively fixed and must remain in one certain relative position even when they are both made movable as explained above, in Note 1; *secondly*, the two image receiving planes of Turner and Jamieson are relatively fixed, whereas my two image receiving planes P and Q are relatively movable, and only one of the two, either P or Q can be made stationary at a time, as explained above in the same Note 1; *thirdly*, the velocity ratio of the Turner and Jamieson pinions is made exactly equal to the focal ratio $\frac{\varphi}{f}$ which, in their case, is 4, whereas the velocity ratio $\frac{Cv''}{Cv}$ of my lever would be equal to the focal ratio squared or 16, instead of 4; *fourthly*, Turner and Jamieson (page 2, line 42) secure correspondence between the two lenses for the object plane at infinity, and they rely for all closer positions of the object plane, on a velocity ratio, whose value ought to be a varying one, but which is made constant and, approximately, one-fourth of what it should be according to my present disclosures; *fifthly*, Turner and Jamieson secure one-point correspondence only, whereas I secure 3-and-all-point correspondence.

NOTE 6.—I am aware that Bragg, in U. S. Patent 339,736, issued April 13, 1886, shows a two-lens camera having a large exposing lens B and a small focuser lens C, that are moved simultaneously by means of a constant velocity ratio mechanism such as pinions D' and D'' shown in his Fig. 8; but according to the Bragg specification, page 4, lines 2 to 6, "the diameters of the pinions D', D'' must be in exact proportion to the power of the two lenses B, C." That is to say, the Bragg camera is the same in principle as that of Turner and Jamieson analyzed above in Note 5. If, therefore, the focal length of the larger exposing lens B in Bragg is, say, three times the focal length of his focuser lens C, then the focusing displacements of such larger lens B will, approximately, be only one-third of what they ought to be, according to my present disclosures.

NOTE 7.—I am aware that Bragg in the same U. S. Patent 339,736 shows, in his Fig. 4, a constant velocity ratio lever H, and in his Fig. 10 means for changing the velocity of such lever H "so as to compensate", as he says, in lines 14 to 16, page 4, "for very slight differences in the focusing power of the two lenses B and C." This Bragg adjustment, however, is evidently intended to allow for accidental and unavoidable errors of construction in the lenses, and it is not intended to materially affect the velocity ratio in the proportion that would be necessary, to make it even approximately accurate in view of my present disclosures.

NOTE 8.—Theoretically accurate optical focusers with 3 separate adjustments to permit of securing exact 3-and-hence-all-point correspondence have so far been disclosed by me as follows: *First*, in Fig. 19 of my said Case A, filed in 1900; *secondly* in Fig. 15 of my said Case Ae, filed in 1915; *thirdly* in Fig. 2 of my present application, Case Af, filed in 1916. This third, last and present disclosure being the most easily understood and, moreover, the most complete, in that its optical focuser is adapted to serve simultaneously as a field finder, I am making in claim 1 of the present application, Case Af, my most general claim to an "optical focuser with 3 adjustments".

NOTE 9.—The camera may be constructed without the first or infinity adjustment illustrated in Fig. 4; that is to say, it may be used with its lenses 49, 49' mounted in any preferred fixed and invariable relative position. In such case the second or infinity adjustment illustrated in Fig. 5, and the third or velocity ratio adjustment made by shifting fulcrum C in groove 67 of bar 68, remain as two absolutely independent adjustments that permit of securing exact 2-point correspondence; and in such case the fully adjusted device will generally act as an approximately accurate constant velocity ratio focusing mechanism whose velocity ratio is approximately equal to the square of the focal ratio $\frac{\varphi}{f}$; that is, approximately equal to $\frac{\varphi \cdot \varphi}{f \cdot f}$.

NOTE 10.—When the lever 66 occupies the zero position of Fig. 5, its fulcrum C may be slid along to any part of bar 68 without disturbing the position of the pintles V, V' which rest in the zero position $v$, $v'$. This renders the velocity ratio adjustment, as in my said Case Ab, entirely independent of the immediately preceding infinity adjustment, and may, therefore, be designated as a "no disturbance" adjustment. Ten such "no disturbance" constant velocity ratio adjustments have so far been disclosed in my various applications as follows: *First*, at pin J', Fig. 19, Case A; *secondly*, in cam 66, Fig. 29, Case A; *thirdly*, at pivot 90, Fig. 33, Case A; *fourthly*, in cam 250, Fig. 57ª, Case A; *fifthly*, at pivot 335, Fig. 57ᵇ, Case A; *sixthly*, in bearings 3, 4, 5, Fig. 10, Case B; *seventhly*, in the cam, Case C; *eighthly*, in the cam, Case F; *ninthly*, in lever 55, Case Ab; *tenthly*, in lever 66, Fig. 2 of my present application, Case Af. The first, ninth, and tenth disclosures show three different exact forms; the seven remaining disclosures show forms that are approximately exact.

NOTE 11.—Any focusing agent may according to the rules of the English language be termed a focuser. In my specification, however, the term "focuser" has a restricted meaning which is most easily specified by the citation of existing patents. Thus "*optical focusers*," in the sense in which I use the term, are seen for instance in the focusing means of the following patents, to wit: Nicour, 71,205, issued November 19, 1867; Bragg, 339,736, issued April 13, 1886; Berthon, 419,910, issued January 21, 1890; Cogswell, 484,179, issued October 11, 1892, and German Patent 188,342, filed June 15, 1904, to du Bois-Reymond; whereas "*mechanical focusers*," in the sense in which I use the term, are seen, for instance, in the focusing means of the following patents, to wit: German Patent No. 102,004, filed June 20, 1897 to Carpentier; my said Case K, now patent 1,103,342; and, my said Case T, now patent 1,142,295.

NOTE 12.—I am aware that Teed, in British Patent No. 17,490 of August 13, 1898, discloses the combination of a photographic camera with an optical focuser of the type comprising means for sighting from two laterally separated points of such focuser, at the same object point to be focused on by the camera; that such Teed focuser comprises a "constant velocity ratio" transmission LSM; and that the velocity ratio $\frac{SL}{SM}$ of such transmission must, according to Teed (lines 34 to 40, page 2) be equal to the focal ratio $\frac{\varphi}{f}$, where $f$ is the basic focal length of the focuser, and phi ($\varphi$) the focal length of the camera lens used. According to my different disclosures, however, this Teed velocity ratio $\frac{SL}{SM}$ should approximately be equal to the focal ratio squared $\frac{\varphi \cdot \varphi}{f \cdot f}$ so that Teed cannot possibly be exact in the present respect, except when the focal ratio $\frac{\varphi}{f}$ is equal to unity.

What I claim as my invention and desire to secure by Letters Patent is:

1. The combination with a photographic camera comprising movable parts adapted to be moved to set the camera in focus on an object in the camera field; of an auxiliary optical arrangement or focuser, for said camera, comprising relatively movable parts that are adapted to be moved to occupy a relative position dependent upon the distance of the same said object in the camera field; structural connections between said relatively movable focuser parts on the one hand, and the said relatively movable camera parts on the other hand, to insure that to each relative position of the said camera parts shall correspond only one relative position of the said focuser parts; said structural connections comprising normally rigid units, each composed of elements whose relative position may be changed to secure the effective dimension of such unit that is required with the particular camera objective used; said adjustable units being present in such number and arrangement as to permit of securing exact correspondence between the said focuser and camera for at least three different distances of the said object in the camera field.

2. The combination with a photographic camera comprising movable parts adapted to be moved to set the camera in focus on an object in the camera field; of an auxiliary optical arrangement or focuser, for said camera, comprising relatively movable parts that are adapted to be moved to occupy a relative position dependent upon the distance of the same said object in the camera field; structural connections between said relatively movable focuser parts on the one hand, and the said relatively movable camera parts on the other hand, to insure that to each relative position of the said camera parts shall correspond only one relative position of the said focuser parts; said structural connections comprising normally rigid units, each composed of elements whose relative position may be changed to secure the effective dimension of such unit that is required with the particular camera objective used; said adjustable units being present in such number and arrangement as to permit of securing exact correspondence between the said focuser and camera for at least three different distances of the said object in the camera field; said focuser being provided with means for showing and substantially defining the limits of the said camera field.

3. The combination with a two lens or compound focusing camera comprising two separate but connected focusing cameras, one with a lens of focal length $f$ and the other with a lens of longer focal length phi ($\varphi$); each camera including a movable part adapted to be moved to set the said camera in focus, mechanism connecting said movable parts whereby they are controlled to simultaneously focus both cameras on any desired common normal object plane of the two camera fields, and whereby, in movement, the velocity ratio of said movable parts is maintained, and substantially constant and equal to the square of the focal ratio, that is to say, substantially equal to $\frac{\varphi \cdot \varphi}{f \cdot f}$.

4. The combination with a two-lens or compound focusing camera comprising two separate but connected focusing cameras, one with a lens of focal length $f$ and the other with a lens of longer focal length phi ($\varphi$); of means for holding said lenses in a fixed relative position with their axes parallel to each other and perpendicular to the line joining their external principal foci; each camera including a movable part adapted to be moved to set the said camera in focus; and mechanism connecting said movable parts whereby they are controlled to simultaneously focus both cameras on any desired common normal object plane of the two camera fields.

5. The combination with a two-lens or compound focusing camera comprising two separate but connected focusing cameras, one with a lens of focal length $f$ and the other with a lens of longer focal length phi ($\varphi$) and means for holding said lenses in a fixed relative position with their axes parallel to each other and perpendicular to the line joining their external principal foci; said cameras having, respectively, image receiving planes P and Q; relatively movable supports for said planes, and mechanism connecting the said two supports to cause them to move simultaneously, with relation to the said lenses in accordance with a velocity ratio whose value is exactly equal to the square of the focal ratio, that is to say, equal to $\frac{\varphi \cdot \varphi}{f \cdot f}$.

6. The combination with a two-lens or compound focusing camera comprising two separate but connected focusing cameras, one with a lens of focal length $f$ and the other with a lens of longer focal length phi ($\varphi$) and means for holding said lenses in a fixed relative position with their axes parallel to each other and perpendicular to the line joining their external principal foci; said cameras having, respectively, image receiving planes P and Q; relatively movable supports for said planes; and mechanism connecting the said two supports to cause them to move simultaneously, with relation to the said lenses, in accordance with a velocity ratio whose value is exactly equal to the square of the focal ratio, that is to say equal to $\frac{\varphi \cdot \varphi}{f \cdot f}$, said connecting mechanism being provided first with a mechanical unit composed of rigidly connected elements whose normally fixed relative position is variable for changing the value of the said velocity ratio to allow for variations in the square, $\frac{\varphi \cdot \varphi}{f \cdot f}$, of the focal ratio, $\frac{\varphi}{f}$, as resulting from variation in the focal lengths phi ($\varphi$) and $f$ of the two lenses used; and provided, secondly, with other independently adjustable mechanical units in the connections to allow for variations in the extent, sign, and location of the internodal spaces of the two lenses.

7. The combination with a two-lens or compound focusing camera comprising two separate but connected cameras, one with a lens of focal length $f$, and the other with a lens of longer focal length phi ($\varphi$), of means for rigidly holding said two lenses with their axes parallel to each other, and perpendicular to the line joining their external principal foci; said holding means comprising a slideway parallel to the lens axes to permit of bringing the lenses accurately into the said desired relative position, and clamping means for permanently holding them in such desired relative position.

8. The combination with a focusing camera comprising two separate lenses, also two separate image receiving planes and mechanical connections between such lenses and planes, to insure that to each relative position of one lens and its respective image receiving plane shall correspond one relative position of the other lens and its respective image receiving plane; said mechanical connections comprising normally rigid units each composed of elements whose relative position may be changed to secure the effective dimension of such unit that is required with the camera lens used; said adjustable units being present in such number and arrangement as to permit of securing exact 3-and-hence-all-point correspondence between the said planes and lenses, by means of three distinct focusing operations performed with one of the said two lenses, and the three corresponding distinct focusing operations performed with the other of the said two lenses.

9. The combination with a two-lens or compound focusing camera comprising 2 separate but connected focusing cameras, one with a lens of focal length $f$ and the other with a lens of longer focal length phi ($\varphi$); a support for holding the said two lenses with their axes parallel to each other and perpendicular to the line joining their external principal foci; said cameras having, respectively, image receiving planes P and Q and relatively movable supports for said planes; also mechanical connections between the said lens support and the said two image plane supports, to insure that the said two cameras shall simultaneously be held in focus on the same normal object plane of the camera field, for any desired distance of said normal object plane; said connecting mechanism being of the constant velocity ratio type with a velocity ratio $m$ that is equal to the square, $\frac{\varphi \cdot \varphi}{f \cdot f}$, of the focal ratio, $\frac{\varphi}{f}$, of the said two lenses.

In testimony whereof, I have signed my name to this specification.

JOSEPH BECKER.